April 10, 1934.　　　C. E. STEERE　　　1,954,501
DOUGH DIVIDER
Filed Nov. 21, 1932　　　2 Sheets-Sheet 1
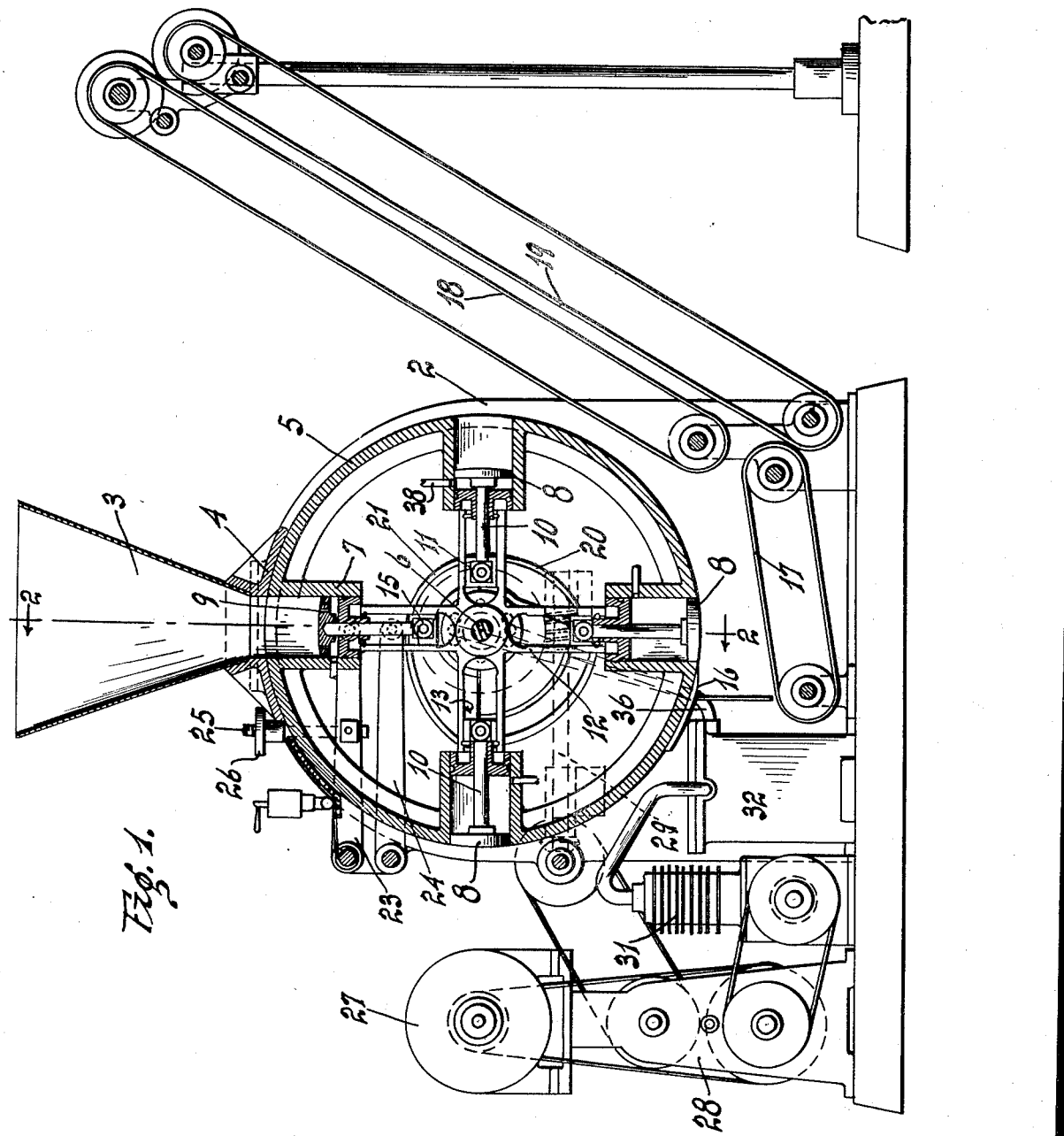
INVENTOR.
CLARENCE E. STEERE.
BY
ATTORNEY.

April 10, 1934.       C. E. STEERE            1,954,501
                       DOUGH DIVIDER
              Filed Nov. 21, 1932       2 Sheets-Sheet 2
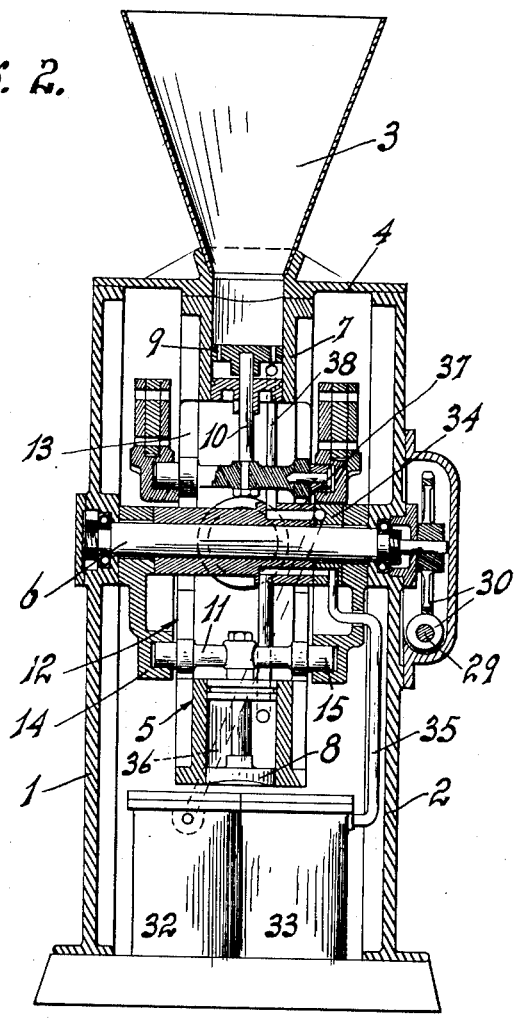
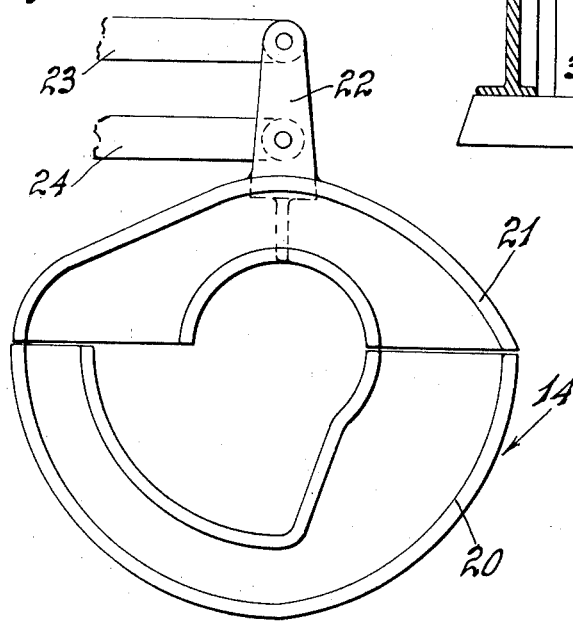
INVENTOR.
CLARENCE E. STEERE.
BY
ATTORNEY.

Patented Apr. 10, 1934

1,954,501

UNITED STATES PATENT OFFICE 1,954,501

DOUGH DIVIDER

Clarence E. Steere, Los Angeles, Calif., assignor to Max A. Dorland, Redondo Beach., Calif.

Application November 21, 1932, Serial No. 643,671

6 Claims. (Cl. 107—15)

This invention relates to a dough divider whereby a mass of dough is sub-divided into sizes suitable for baking. In dough dividers, heretofore in use, the dough was acted upon by pistons which were violently projected against the dough by a spring, and this process caused the dough to be injured so that it would not properly rise without an excessive amount of yeast.

An object of my invention is to divide the dough without injuring the same and without striking or otherwise mutilating the dough.

Another object is to provide a novel dough divider in which the dough is drawn into a cylinder by a vacuum and is subsequently carefully ejected from the cylinder by a piston.

A further object is to provide a dough divider of the character stated which will rapidly and accurately divide the dough, and to further provide a device which is simple in construction and which will not get out of order.

A feature of my invention resides in a novel means for adjusting the position of the piston in the cylinder, thereby varying the capacity of the cylinder.

Other objects, advantages and features of invention may appear from the accompanying drawings, the subjoined detailed description and the appended claims.

In the drawings:

Figure 1 is a transverse, sectional view of my machine.

Figure 2 is a sectional view taken on line 2—2 of Figure 1.

Figure 3 is a side elevation of one of the split cams.

Referring more particularly to the drawings, my machine comprises a pair of side plates 1—2. These plates are spaced a suitable distance apart so as to receive the dividing mechanism between them, as will be further described. A hopper 3 is supported on the top of the plates 1—2 by a base 4. A drum 5 is rotatably mounted between the plates 1 and 2 upon a shaft 6 which is journaled in the plates. The drum 5 has a plurality of cylinders 7 formed therein, and these cylinders project inwardly substantially as shown. The cylinders are open at the outer end and closed at the inner end.

A piston 8 is reciprocally mounted in each of the cylinders. Each piston is provided with a plurality of ports 9 which extend through it, and the purpose of these ports will be further described. A pitman 10 extends inwardly from each of the pistons and is attached to a crosshead 11. Each arm of the spider 12 is formed with a slot 13 in which the crosshead 11 is reciprocally mounted, that is, each crosshead extends transversely of the drum 5 and fits in the slots 13 on each side of the drum. A stationary split cam 14 is positioned on each side of the drum 5, and the ends of the crossheads 11 are provided with rollers 15 which extend into the grooves of the cam. The cam is so arranged that the pistons 8 will be drawn inwardly at the top and will be forced outwardly at the bottom. The pistons at the bottom of the drum are flush with the periphery thereof so that all of the dough is ejected from the cylinder.

A scraper knife 16 bears against the periphery of the drum 5 at the bottom so that all of the dough is wiped from the piston. The divided dough falls upon a traveling conveyor 17, and thence into upwardly extending conveyors 18—19 and is then carried to the subsequent operations usual in a bakery.

The cam 14 is formed in two sections, a lower stationary segment 20 and an upper movable segment 21. The purpose of the upper movable segment is to accurately limit the position of the piston 8 when it is in the upper or charging position, the capacity of the cylinder is thus varied to suit the needs of the occasion. Each of the cams is provided with an upwardly extending lug 22 which rises from the movable segment 21. A pair of arms 23—24 are pivotally attached to the lug 22 and are journaled at their outer ends in the side plates 1—2.

A threaded bolt 25 is attached to the arms 23, and a nut 26 screws on to the bolt and rests on the frame. By screwing the nut up or down, the arms 23—24 are raised or lowered to adjust the upper segments 21. A motor 27 is mounted adjacent the divider, and this motor drives a transmission 28. The shaft 6 is rotated from the transmission 28 through the shaft 29 and the gears 30. The transmission also drives a pump 31, and this pump maintains a partial vacuum in the tank 32, and a pressure in the tank 33.

A valve 34 surrounds the shaft 6 and is stationary. A pipe 35 extends from the pressure tank 33 to the lower part of the valve, and a pipe 36 extends from the vacuum tank 32 to the upper part of the valve. The valve 34 is provided with a rotatable sleeve 37, and a pipe 38 extends from each of the cylinders 7 through the sleeve; thus when each of the cylinders are at the top or charging position, a vacuum is being drawn through the pipe 38 and the outer end of the cylinder is evacuated because of the ports 9 in the piston.

The vacuum assists in drawing the dough downwardly out of the hopper 3.

The drum continues to rotate to the right, as viewed in Figure 1. The dough is cut off by the edge of the cylinder acting against the base 4. When the filled cylinder reaches the bottom, the piston 8 is forced outwardly by the cam 14 and the mass of dough is ejected. Particles of dough might lodge in the ports 9, and to overcome this contingency a pressure is exerted in the cylinder at the lower position thereof because the pipe 38 is placed in communication with the pressure pipe 35 in the valve 34.

Having described my invention, I claim:

1. A dough divider comprising a hopper, a cylinder, means movably mounting the cylinder below said hopper, ejecting means in said cylinder, and means to reciprocate said ejecting means whereby the dough is removed from the cylinder when said cylinder is carried away from the hopper, and means to evacuate said cylinder when the cylinder is under the hopper, and means to exert a pressure in said cylinder when the cylinder is moved from the hopper.

2. A dough divider comprising side plates, a hopper mounted on the side plates, a drum rotatably mounted between the side plates and below the hopper, a plurality of cylinders in the drum, a piston in each cylinder, means engaging the pistons whereby they are reciprocated, means to rotate said drum whereby the cylinders are sucessively carried under the hopper to receive the dough therefrom, and means to evacuate the cylinders when they are under the hopper, and means to exert a pressure in the cylinders when they are in lowered and discharging position.

3. A dough divider comprising a pair of side plates, a hopper mounted on top of said plates, a drum rotatably mounted between the plates, drive means for said drum, a plurality of cylinders in the drum, a piston in each cylinder, a pitman extending from each piston, a crosshead on each pitman, a stationary cam on the side plate, said crossheads extending into the cam and are guided thereby, said cam reciprocating the pistons as the drum rotates, a vacuum line extending to the cylinders, said vacuum line being adapted to evacuate the cylinders when they are under the hopper, and a pressure line extending to the cylinders, said pressure line being adapted to exert a pressure in the cylinders when they are in lowered and discharging position.

4. A dough divider comprising a pair of side plates, a hopper mounted on top of said plates, a drum rotatably mounted between the plates, drive means for said drum, a plurality of cylinders in the drum, a piston in each cylinder, a pitman extending from each piston, a crosshead on each pitman, a stationary cam on the side plate, said crossheads extending into the cam and are guided thereby, said cam reciprocating the pistons as the drum rotates, a vacuum line extending to the cylinders, said vacuum line being adapted to evacuate the cylinders when they are under the hopper, and a pressure line extending to the cylinders, said pressure line being adapted to exert a pressure in the cylinders when they are in lowered and discharging position, said pistons having a plurality of ports extending therethrough, the vacuum and pressure being exerted in the cylinders below the pistons.

5. A dough divider comprising a pair of side plates, a hopper mounted on top of said plates, a drum rotatably mounted between the plates, drive means for said drum, a plurality of cylinders in the drum, a piston in each cylinder, a pitman extending from each piston, a crosshead on each pitman, a stationary cam on the side plate, said crossheads extending into the cam and are guided thereby, said cam reciprocating the pistons as the drum rotates, the upper half of said cam being movable relative to the lower half, and means connected to the upper half of the cam whereby the upper part of the cam is adjusted vertically, a vacuum line extending to the cylinders, said vacuum line being adapted to evacuate the cylinders when they are under the hopper, and a pressure line extending to the cylinders, said pressure line being adapted to exert a pressure in the cylinders when they are in lowered and discharging position.

6. A dough divider comprising a frame, a hopper, a drum rotatably mounted in the frame and below the hopper, a plurality of cylinders in the drum, a piston in each cylinder, means engaging the pistons whereby they are reciprocated, means to rotate said drum whereby the cylinders are successively carried under the hopper to receive the dough therefrom, means to evacuate the cylinders when they are under the hopper, and means to exert a pressure in the cylinders when they are away from the hopper.

CLARENCE E. STEERE.